United States Patent [19]
Venters et al.

[11] Patent Number: 5,875,202
[45] Date of Patent: Feb. 23, 1999

[54] TRANSMISSION OF ENCODED DATA OVER RELIABLE DIGITAL COMMUNICATION LINK USING ENHANCED ERROR RECOVERY MECHANISM

[75] Inventors: W. Stuart Venters; Kevin W. Schneider, both of Huntsville, Ala.

[73] Assignee: Adtran, Inc., Huntsville, Ala.

[21] Appl. No.: 626,232

[22] Filed: Mar. 29, 1996

[51] Int. Cl.[6] ........................... G06F 11/10
[52] U.S. Cl. .................. 371/53; 371/37.01; 371/37.7
[58] Field of Search ................... 371/53, 37.01, 371/37.7

[56] References Cited

U.S. PATENT DOCUMENTS

| | | | |
|---|---|---|---|
| 4,754,482 | 6/1988 | Weiss | 380/48 |
| 5,130,993 | 7/1992 | Gutman et al. | 371/42 |
| 5,390,195 | 2/1995 | Brush | 371/37.1 |
| 5,606,569 | 2/1997 | MacDonald et al. | 371/37.7 |

Primary Examiner—Phung M. Chung
Attorney, Agent, or Firm—Charles E. Wands

[57] ABSTRACT

In order to transport digital data across a reliable digital communication link from a transmit site to a destination site, the data is processed in parallel paths to derive error detection information, such as a cyclic redundancy code, and to encode the data. The outputs of the parallel paths are combined into a composite digital data sequence, which is then transmitted over the reliable digital communication link to the destination site. At the destination site, the encoded digital data component of the composite data sequence is decoded and then subjected to the same error detection operation carried out at the transmit site to derive error detection information associated with the decoded digital data. This recalculated error detection information is compared with the error detection information component contained in the composite digital data sequence. If there is a mismatch, the reliable digital communication link and the encoder at the transmit site and the decoder at the destination site are reset.

24 Claims, 4 Drawing Sheets

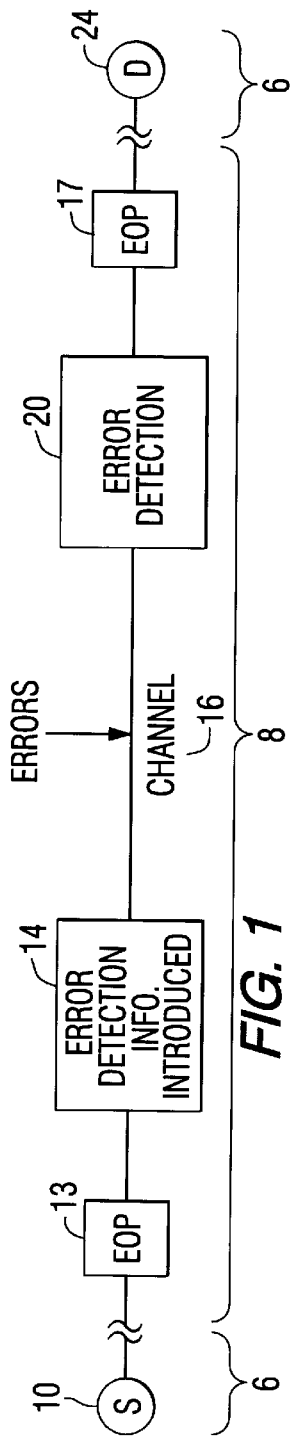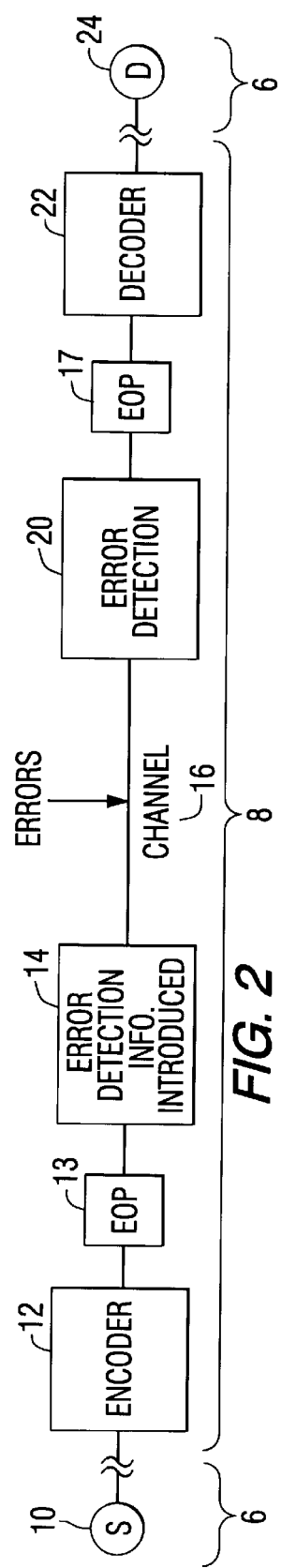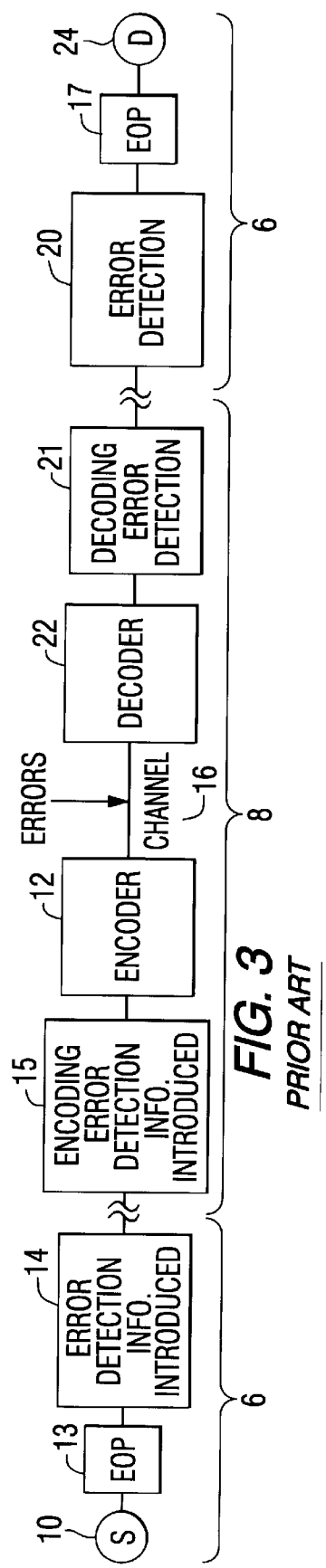

TRANSMISSION OF ENCODED DATA OVER RELIABLE DIGITAL COMMUNICATION LINK USING ENHANCED ERROR RECOVERY MECHANISM

FIELD OF THE INVENTION

The present invention relates in general to digital data communication systems and is particularly directed to improved error detection and recovery scheme employed in the transport of encoded digital data over a reliable digital communication link.

BACKGROUND OF THE INVENTION

In digital communications, it is sometimes useful to send data over a link in an encoded form (where the form of the coding is data compression or data encryption). For successful operation of the encoded link, it is necessary that the decoder at the receive end of the link be synchronized with the encoder at the transmit end of the link; namely, the output of the encoder must be the same as the input to the decoder. The link itself may be either a reliable link, having an error recovery scheme incorporated into the link proper, or it may be an unreliable link (usually one that possesses an inherently low error rate) in which no error recovery is built into the link.

FIG. 1, which corresponds to FIG. 1 of U.S. Pat. No. 5,130,993 to Gutman et al, diagrammatically illustrates a simplified version of a conventional reliable digital communication link 8 (such as an ITU-T Recommendation V.42-based link), having elements of procedure 13 and 17 and associated error detection components 14 and 20 (together forming the link access protocol (LAP)), coupled therewith and with communication channel 16, at end sites 6 of the reliable link servicing respective source and destination devices 10 and 24, respectively.

In the course of transmission of digital communication signals between respective link sites 6, errors may be introduced into the data from a number of sources, such as crosstalk, noise spikes or power line surges. These errors are customarily detected by providing an error detection mechanism (such as the use of a cyclic redundancy check (CRC) code) 14 in the path of the data stream through the elements of procedure 13 at the source end 10 of the link, and employing associated error detection mechanism 20 coupled with the elements of procedure 17 at the destination end 24 of the link, in order to extract error information in the transported data stream.

If a received frame contains an error, the destination site elements of procedure will forward a retransmission request over a reverse channel (not shown) to the source elements of procedure 13 associated with the source end 10 and one or more frames of data are retransmitted, as necessary, to clear the errored frame(s). Once a received frame has been verified as error-free, it is passed on to a destination terminal device in the order transmitted, so that the destination terminal device 24 will receive the error-free frames in the proper sequence.

It is often desirable to employ data compression or encryption over the channel 16, using an encoder at the transmitter and a corresponding decoder at the receiver (such as the use of V.42 bis data compression, as a non-limiting example). This has been typically done by operating the encoding—decoding pair over a reliable link (such as that shown in FIG. 1). The resulting encoded reliable link is diagrammatically illustrated at 8 in FIG. 2, which corresponds to FIG. 2 of the above-referenced U.S. Pat. No. 5,130,993, wherein an encoder 12 is installed upstream of the elements of procedure 13 adjacent to the source end 10 of the channel 16, and a decoder 22 is installed downstream of the elements of procedure 17, at the receive end 24 of the link. In this combination, the error detection mechanism is typically built with a CRC code.

Now although the incorporation of a CRC error detection mechanism into the reliable link (13-14-16-20-17) is customarily operative to detect damaged or errored frames, it suffers from the fact that it has a finite, albeit small, probability of passing a damaged frame. If such a damaged frame is not detected and retransmitted, the encoder 12 and decoder 22 will become unsynchronized. The result is that the encoded link will begin to pass undetected corrupted data from the source 10 to the destination 24 until the link is externally reset.

One proposal to obviate the above-described shortcoming of such an encoded reliable link is to re-order the elements on the link so that the LAP can correct both channel and decoder errors. This causes the encoder-decoder pair to operate on a link without error correction or detection, which is referred to as an unreliable link. In order to resynchronize the encoder-decoder pair, an additional error detection and signalling function is added between the LAP and the encoder-decoder pair. This system is diagrammatically illustrated in FIG. 3, which corresponds to FIG. 3 of the above-referenced U.S. Pat. No. 5,130,993.

In accordance with this unreliable link architecture, at the transmit or source end 10 of the unreliable link 8, error detection information 15 is added to the data downstream of the elements of procedure 13 and the error detection mechanism 14, but prior to encoder 12. The injected error detection information is subsequently extracted by means of a decoding detection unit 21 that is located downstream of the decoder 22, but upstream of the error detection unit 20 and elements of procedure 17 at the destination end 24 of the link 8, in order to determine if synchronization of the encoder-decoder pair is required.

In effect, what the above-referenced Gutman et al patent describes is an automatic method to provide the external reset necessary for the system of FIG. 2. However, the drawbacks of this method are the fact that the link access protocol is further removed from the channel, resulting in longer error recovery response times, and that the compression ratio is decreased, since the encoder is reset whenever a channel error occurs.

Another method, diagrammatically illustrated in FIG. 3A, is used in TIA/EIA-655 digital data encapsulation protocol and slightly reduces the magnitude of the above drawbacks. The scheme shown in FIG. 3A adds a subset of the reliable link elements of procedure, that of sequencing and error detection, between an encoder/decoder pair and the channel. This method also changes the method by which the encoding error detection information is added, so that the added information is not run through the encoder.

More particularly, at the transmit end of the link, shown at 6, data from a source 10 is coupled to elements of procedure 13, the output of which is coupled to error detection mechanism 14. The output of error detection mechanism 14 is then coupled in parallel to each of an encoder 120 and the calculation of encoding error detection information 150, prior to being processed in accordance with elements of procedure 130 in the signal flow path to a semi-reliable link 80. The outputs of the encoder 120 and encoding error detection information calculation block 150 are combined in a merge unit 125, to produce composite data. The composite data is then applied to the elements of procedure 130, and output therefrom to a transmitter unit 140, which introduces error detection information and transmits the data across channel 160 to the destination end of semi-reliable link 80.

At the receive end of the channel 160, an error detection receiver unit 200 receives the composite data, checks the data for errors and couples the received data to associated elements of procedure 170. The EOP 170 checks the incoming data for proper sequencing and either outputs correctly sequenced data or resets the semi-reliable link 80 if out-of-sequence data is received. Each block of composite data at the output of the elements of procedure 170 is decomposed as an encoded data block component and an associated error detection information component. The decomposed encoded data block component is coupled to a decoder 220, which decodes the encoded data block as a potentially valid output data block.

In the absence of errors, the received encoded data block is optimally decoded back into its original unencoded format as supplied by data source 10 at the transmit end of the link. The output of decoder 220 is further coupled to a decoding error detection operator 210, which calculates errors in the received data. If an error is detected, operator 210 outputs a restart request signal to the elements of procedure 170, so as to reset the decoder 220.

In addition, elements of procedure 170 cause the receiver unit 200 to transmit a message on a return channel portion of the link 80 to the EOP 130 at the transmit site, requesting that the encoder 120 and link 80 be reset. In response to this request, the encoder 120 at the transmit site is restarted and the errored data frame is lost. With each of the encoder 120 and the decoder 220 now resynchronized, the contents of the new data frames should be processed correctly at each end of the link. The output of decoder 220 is input to an error detection unit 20, which is coupled to elements of procedure 17 at the destination end 24 of the link.

One advantage of the scheme of FIG. 3A over that of FIG. 3 is the fact that the encoder-decoder pair 120/220 is connected over a 'semi-reliable' link instead of a raw channel. This 'semi-reliable' link causes most error events to be detected without decoding, which reduces the error handling effort, and hence time, resulting in a slightly improved error recovery response time. In addition, the compression ratio is slightly higher, since the error detection information is not run through the encoder, as error detection information tends to be uncorrelated with the data.

SUMMARY OF THE INVENTION

In accordance with the present invention, the previously described problems of existing error recovery mechanisms for encoded digital communication links are effectively obviated by installing an additional error recovery mechanism, similar to the parallel mechanism employed in the 'semi-reliable' link of FIG. 3A, upstream of, and in concert with, a 'reliable' link access protocol.

More particularly, pursuant to the present invention, prior to being transported across a reliable link, the data to be encoded is subjected to a calculation of error detection information (such as the calculation of a CRC code), that is installed in parallel with the encoding path, so as to derive error detection information associated with a respective encoded block of data. Prior to being processed in accordance with a link access protocol mechanism of elements of procedure in the signal flow path to the reliable link, the data and the derived error detection code are combined or merged with one another, by appending the error detection code to the encoded data block to produce a composite data block.

The resulting composite data block is then applied to elements of procedure, whose output is coupled to a high level data link control (HDLC) transmitter. The HDLC transmitter introduces additional error detection information and transmits successive frames comprised of an elements of procedure header and such composite data blocks (encoded data and appended CRC codes) across the reliable link to the destination end.

At the receive end of the reliable link, an HDLC receiver checks for errors, receives the composite data sequence that has been transmitted across the reliable link, and couples the composite data to associated elements of procedure. Each frame of received composite data provided at the output of the elements of procedure is then decomposed into an encoded data block component and an associated error detection information (CRC) code component. The decomposed encoded data block component is coupled to a decoder, which decodes the encoded data block (optimally back into its original unencoded format) as a potentially valid output data block. The output of the decoder is buffered and also coupled to an error detection mechanism, which recalculates the error correction code based upon the decoded data output of the decoder.

The contents of the recalculated error correction code generated by the error detection mechanism are then compared with the recovered error detection information (CRC) code component decomposed by the elements of procedure to determine whether or not errors are present in the recovered data. If an error (CRC comparison mismatch) is detected the decoder discards the errored frame, the elements of procedure in the receiver resets the decoder and transmits a message on a return link to the transmit site, requesting that the encoder be reset and the elements of procedure be restarted.

Encoding and retransmission of errored frames are then reinstated, with the upstream encoder being synchronized with the downstream decoder, so that the contents of new data blocks will be processed correctly at each end of the reliable link.

BRIEF DESCRIPTION OF THE DRAWINGS

FIG. 1 corresponds to FIG. 1 of U.S. Pat. No. 5,130,993 and diagrammatically illustrates a simplified version of a reliable digital communication network;

FIG. 2 corresponds to FIG. 2 of U.S. Pat. No. 5,130,993 and diagrammatically illustrates an example of an encoding and error recovery scheme for a reliable digital communication network;

FIG. 3 corresponds to FIG. 3 of U.S. Pat. No. 5,130,993 and diagrammatically illustrates an example of an error recovery scheme for an unreliable digital communication network;

DETAILED DESCRIPTION

Figure 3A:
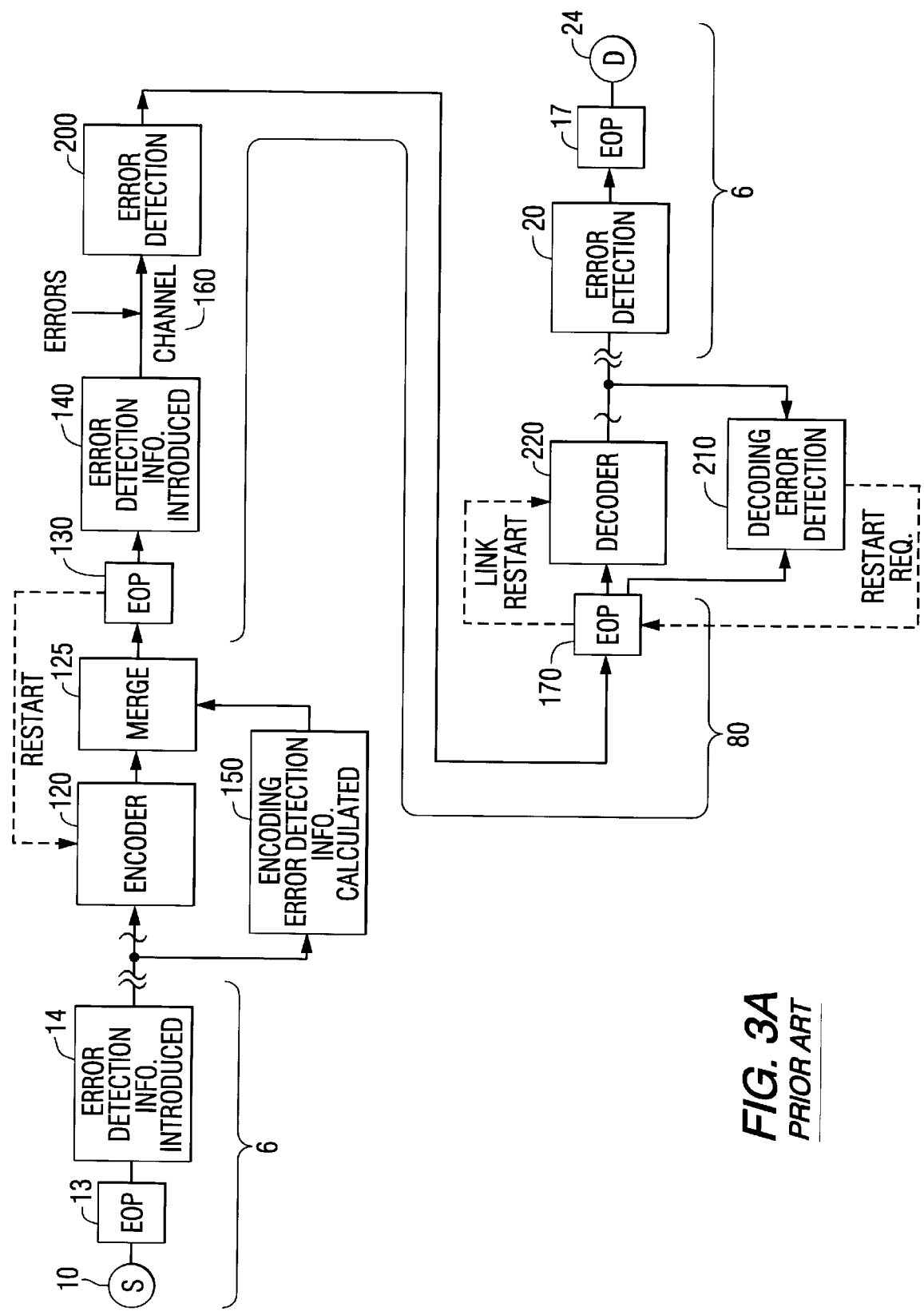
FIG. 3A shows a scheme used in TIA/EIA-655, which adds a subset of the reliable link EOP—that of sequencing and error detection, between the encoder/decoder and the channel.

Before describing in detail the new and improved reliable link error recovery mechanism in accordance with the present invention, it should be observed that the invention resides primarily in what is effectively a prescribed arrangement of encoding/decoding mechanisms, and communication exchange controllers that are embedded in the communications control software resident in the transceiver equipment at the respective source and destination ends of a reliable digital communication link. The particular data format and protocol mechanisms employed, such as V.42 and V.42 bis, referenced above, as non-limiting examples, are not considered part of the invention.

Consequently, the invention has been illustrated in the drawings in readily understandable block diagram format, which show only those specific details that are pertinent to the present invention, so as not to obscure the disclosure with details which will be readily apparent to those skilled in the art having the benefit of the description herein. Thus, the block diagram illustrations are primarily intended to illustrate the major components of the system in a convenient functional grouping, whereby the present invention may be more readily understood.

Figure 4:
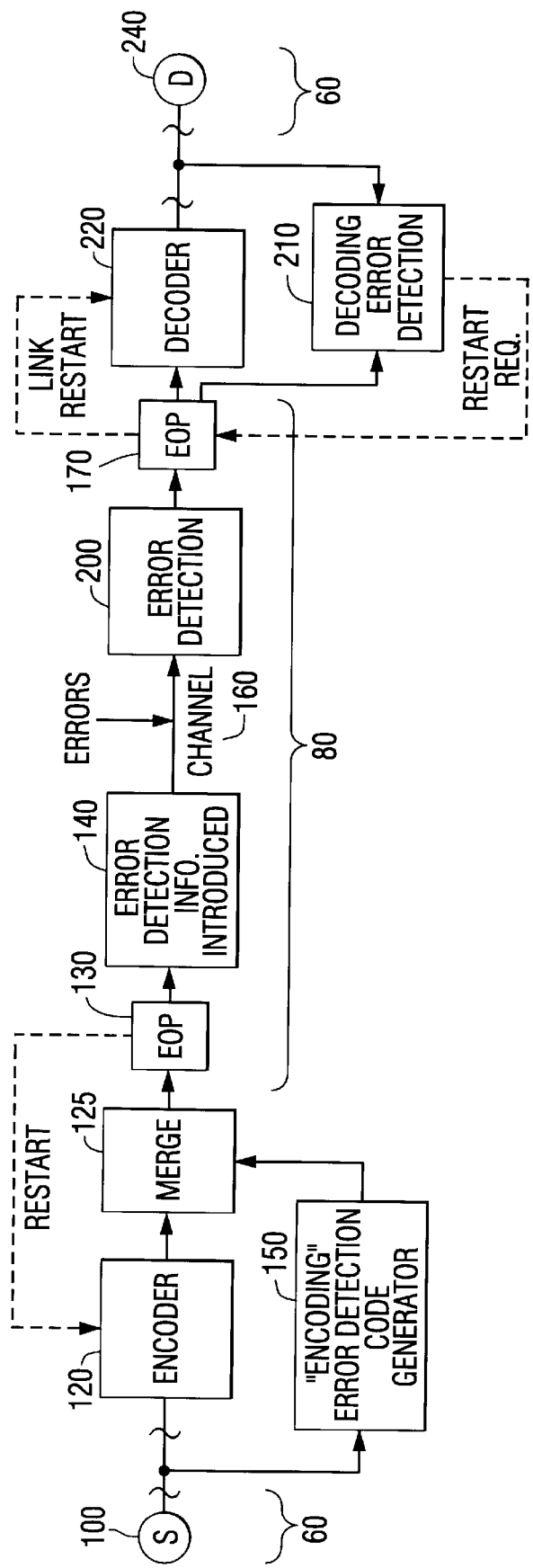
FIG. 4 diagrammatically illustrates a reliable digital communication link containing an enhanced error recovery scheme in accordance with an embodiment of the present invention.
Figure 5:
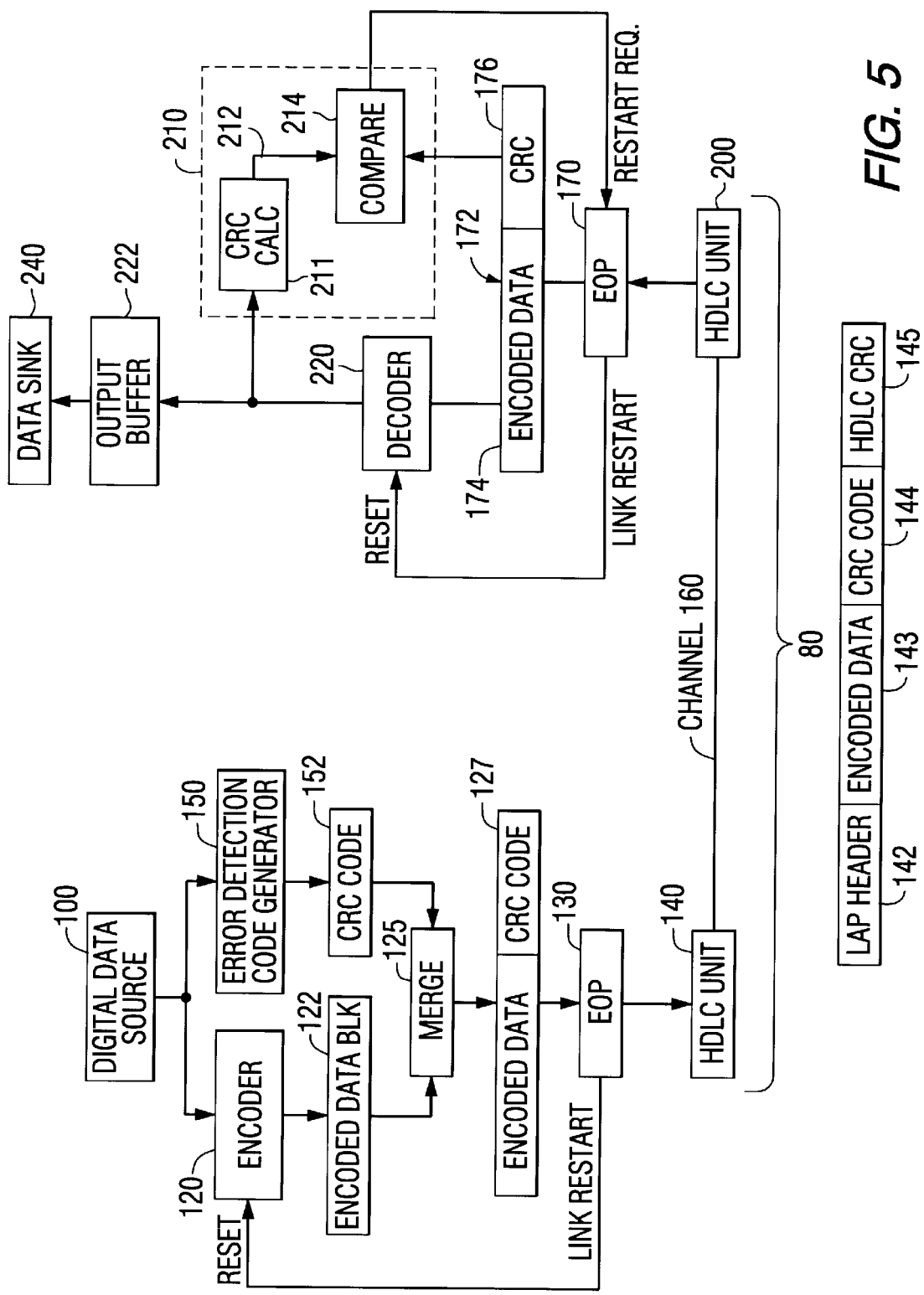
FIG. 5 diagrammatically illustrates, in more detail, the reliable digital communication link of FIG. 4.

To facilitate an understanding of the reliable digital communication link according to the present invention, its architecture is illustrated in FIG. 4 in a diagrammatic format that generally conforms with the convention of FIGS. 1—3 and 3A, described above, but with zeros added to the reference numerals associated with components of like or similar functionality found in the diagrams of FIGS. 1—3 and 3A. FIG. 5 shows the architecture of FIG. 4 in greater detail.

As shown therein, a source 100 of digital data, at a first end site 60, has its output coupled in parallel to each of an encoder 120 and an error detection code generator 150. Like the encoder 12 of the reliable architecture of FIG. 2, encoder 120 encodes the data supplied by source 100 in accordance with a data encoding algorithm, such as V.42 bis data compression, referenced above, and outputs an encoded data block 122. In addition to being encoded/compressed, each respective block of data in the data stream output by source 100 is applied via a parallel data flow path to error detection code generator 150, which calculates an error detection code (e.g. a CRC code) 152 for each respective block of data being processed.

Prior to being processed in accordance with a link access protocol elements of procedure 130 for the reliable link 80, the encoded data block 122 and the derived error detection code 152 are combined in a merge unit 125, which is operative to append the (CRC) error detection code 152 to the encoded data block 122 to produce a composite data block 127. The composite data block 127 is then applied to elements of procedure 130, the output of which is coupled to an HDLC transmitter unit 140, which transmits successive frames 141 comprised of a LAP header 142, encoded data 143, and appended CRC codes 144 and 145 across a channel 160 to the destination end of the reliable link 80.

At the receive end of the channel 160, an HDLC (error detection) receiver unit 200 checks for errors and receives the composite data sequence that has been transmitted across channel 160 of the link 80, and couples the received composite data blocks to associated elements of procedure 170. Each block of composite data at the output of the elements of procedure 170 is decomposed, as shown at 172, as an encoded data block component 174 and an associated error detection information (CRC) code component 176.

The decomposed encoded data block component 174 is coupled to a decoder 220, which decodes the encoded data block as a potentially valid output data block. As noted briefly above, in the absence of errors, the received encoded data block 174 is optimally decoded back into its original unencoded format as supplied by data source 100 at the transmit end of the link. The output of decoder 220 is buffered in an output memory 222 prior to being coupled to a data destination or sink 240.

Pursuant to the invention, the output of decoder 220 is further coupled to a decoding error detection operator 210, which contains the same (CRC) error correction code algorithm employed by the error detection code generator 150 at the transmit end of the reliable link 80. In the absence of errors in the transported data, decoding error detection operator 210 should calculate the same error detection (CRC) code as that generated at 152 by the error detection code generator 150 and appended to the encoded data block 122 at the transmitter.

In order to determine whether or not errors are present in the received data, the contents of the 'recalculated' CRC error correction code 212, as generated by CRC calculator 211 within decoding error detection operator 210, are compared in a comparator 214 with the recovered error detection information (CRC) code component 176 decomposed by the elements of procedure 170. If an error (a CRC comparison mismatch) is detected, comparator 214 outputs a restart request signal to the elements of procedure 170, so as to reset the decoder 220.

In addition, elements of procedure 170 causes HDLC receiver unit 200 to transmit a message on a return channel portion of the link 80 to the HDLC transmitter unit 140 at the transmit site, requesting that the encoder 120 and link 80 be reset. In response to this request, the encoder 120 at the transmit site is restarted and the errored data frame is lost. With each of the encoder 120 and the decoder 220 now resynchronized, the contents of the new data frames will be processed correctly at each end of the link.

As will be appreciated from the foregoing description, the above described problems of existing error recovery mechanisms for encoded digital communication links are effectively obviated in accordance with the present invention by installing an additional error recovery mechanism upstream of, and in concert with, the reliable LAP. As noted above, generating the checksum code exclusive of the encoding mechanism allows the 'recalculated' error correction code to be compared with the recovered error detection (CRC) code component at the receiver, and thereby accurately determine whether or not errors are present in the received data.

While I have shown and described an embodiment in accordance with the present invention, it is to be understood that the same is not limited thereto but is susceptible to numerous changes and modifications as known to a person skilled in the art, and I therefore do not wish to be limited to the details shown and described herein but intend to cover all such changes and modifications as are obvious to one of ordinary skill in the art.

What is claimed:

1. A method of transporting digital data across a reliable digital communication link comprising the steps of:
   (a) prior to processing said data with elements of procedure that are farthest upstream elements of procedure relative to said reliable digital communication link, subjecting said digital data to an error detection operation to derive error detection information associated with said digital data, and encoding said digital data;
   (b) combining said encoded digital data and said error detection information into a composite digital data sequence containing an encoded digital data component and an error detection component;

(c) processing said composite digital data sequence in accordance with link access protocol elements of procedure and transmitting said composite digital data sequence across said reliable link;

(d) receiving said composite digital data sequence that has been transmitted across said reliable link in step (c) and processing said composite digital data sequence in accordance with elements of procedure to provide encoded digital data components of said composite data sequence;

(e) decoding the encoded digital data component of said composite data sequence received and processed in step (d) to obtain decoded digital data;

(f) subjecting said decoded digital data obtained in step (e) to an error detection operation so as to derive error detection information associated with said decoded digital data;

(g) comparing the error detection information associated with said decoded digital data derived in step (f) with the error detection information component contained in said composite digital data sequence received in step (d); and (h) controllably resetting the digital data encoding operation of step (a) and/or the reliable digital communications link of step (c), in dependence upon the result of step (g) of comparing said error detection information associated with said decoded digital data derived in step (f) with said error detection information component of said composite digital data sequence in received in step (d).

2. A method according to claim 1, wherein step (h) includes controllably requesting retransmission of digital data in accordance with the result of step (g).

3. A method according to claim 1, wherein step (c) comprises applying said composite digital data sequence to a reliable channel by way of said link access protocol elements of procedure and a high level data link control unit.

4. A method according to claim 1, wherein step (d) comprises the steps of:

(d1) receiving said composite digital data sequence that has been transmitted across said reliable link and processing said composite digital data sequence in accordance with elements of procedure to provide encoded digital data components of said composite data sequence; and (d2) decomposing the composite digital data sequence received and processed in step (d1) into an encoded digital data component and an error detection information component.

5. A method according to claim 1, wherein said error detection information comprises a cyclic redundancy check code.

6. A method of transporting digital data across a reliable digital communication link comprising the steps of:

(a) prior to processing said digital data with elements of procedure that are farthest upstream elements of procedure relative to said reliable digital communication link, subjecting unencoded digital data to a data encoding operation so as to derive encoded digital data;

(b) subjecting said unencoded digital data to an error detection operation to derive error detection information associated with said unencoded digital data;

(c) combining said encoded digital data and said error detection information into a composite digital data sequence; and (d) processing said composite digital data sequence in accordance with link access protocol elements of procedure and transmitting said composite digital data sequence across said reliable digital communication link.

7. A method according to claim 6, further comprising the steps of:

(e) receiving said composite digital data sequence that has been transmitted across said reliable digital communication link and processing said composite digital data sequence in accordance with elements of procedure to provide encoded digital data components of said composite data sequence;

(f) decomposing the composite digital data sequence received and processed in step (e) into an encoded digital data component and an error detection information component;

(g) decoding the encoded digital data component decomposed form said composite data sequence in step (f) to derive decoded digital data;

(h) subjecting said decoded digital data derived in step (g) to said error detection operation so as to derive error detection information associated with said decoded digital data;

(i) comparing the error detection information associated with said decoded digital data derived in step (h) with the error detection information component decomposed from said composite digital data sequence in step (f); and (j) controllably resetting the digital data encoding operation of step (a) and/or the reliable digital communications link of step (e), in dependence upon the result of step (i) of comparing said error detection information associated with said decoded digital data derived in step (h) with said error detection information component of said composite digital data sequence received in step (f).

8. A method according to claim 7, wherein step (j) further includes controllably requesting retransmission of digital data.

9. A method according to claim 7, wherein step (d) comprises applying said composite digital data sequence to a reliable channel by way of said link access protocol elements of procedure and a high level data link control unit, and wherein step (e) comprises receiving said composite digital data sequence that has been transmitted across said reliable digital communications link by way of a high level data link control unit and elements of procedure coupled thereto.

10. A method according to claim 6, wherein said error detection information comprises a cyclic redundancy check code.

11. For use with a reliable digital communication link, wherein, at a transmitter site, prior to being processed with elements of procedure that are farthest upstream elements of procedure relative to said reliable digital communication link, digital data to be transported over said reliable digital communication link is subjected to each of an error detection operation, which derives error detection information associated with said digital data, and an encoding operation, which provides encoded digital data that is combined with said error detection information into a composite digital data sequence and is processed in accordance with link access protocol elements of procedure and is transmitted over said reliable digital communication link, a method of controlling the operation of said reliable digital communication link, said method comprising the steps of:

(a) receiving said composite digital data sequence that has been transmitted across said reliable digital communication link and processing said composite digital data sequence in accordance with elements of procedure to provide encoded digital data components of said composite data sequence;

(b) decoding the encoded digital data component of said composite data sequence received and processed in step (a) to obtain decoded digital data;

(c) subjecting said decoded digital data obtained in step (b) to an error detection operation so as to derive error detection information associated with said decoded digital data;

(d) comparing the error detection information associated with said decoded digital data derived in step (c) with the error detection information component contained in said composite digital data sequence received in step (a); and (e) controllably resetting the digital data encoding operation carried out at said transmitter site, and the digital data decoding operation of step (b), in dependence upon the result of step (d) of comparing said error detection information associated with said decoded digital data derived in step (c) with said error detection information component of said composite digital data sequence in received in step (a).

12. A method according to claim 11, wherein step (a) comprises the steps of:

(a1) receiving said composite digital data sequence that has been transmitted across said reliable digital communication link and processing said composite digital data sequence in accordance with elements of procedure to provide encoded digital data components of said composite data sequence; and (a2) decomposing the composite digital data sequence received and processed in step (a1) into an encoded digital data component and an error detection information component.

13. A method according to claim 11, wherein said error detection information comprises a cyclic redundancy check code.

14. A system for transporting digital data across a reliable digital communication link between a transmit site and a destination site comprising:

at said transmit site,
upstream of elements of procedure through which said digital data is processed that are farthest upstream elements of procedure relative to said reliable digital communication link, an error detection operator to which said digital data is applied, and which is operative to derive error detection information associated with said digital data, and a digital data encoder to which said digital data is applied and which is operative to encode said digital data; and a transmitter which is coupled to said error detection operator and said digital data encoder and which processes said composite digital data sequence in accordance with link access protocol elements of procedure and transmits a composite digital data sequence containing an encoded digital data component as encoded by said digital data encoder, and an error detection component as derived by said error detection operator; and at said destination site,
a receiver which receives said composite digital data sequence that has been transmitted across said reliable digital communication link from said transmit site and processes said composite digital data sequence in accordance with elements of procedure to provide encoded digital data components of said composite data sequence;

a decoder which decodes the encoded digital data component of said composite data sequence received and processed by said receiver to obtain decoded digital data;

an error detection operator to which said decoded digital data obtained by said decoder is applied and which outputs error detection information associated with said decoded digital data;

a comparator, which is coupled to said error detection operator and said receiver, and is operative to compare the error detection information associated with said decoded digital data with the error detection information component contained in said composite digital data sequence; and a synchronization controller which is operative to controllably reset said digital data encoder and said digital data decoder in dependence upon the output of said comparator.

15. A system according to claim 14, wherein said synchronization controller is operative to controllably cause a retransmission of digital data in dependence upon the output of said comparator.

16. A system according to claim 14, wherein said transmitter includes link access protocol elements of procedure and a high level data link control unit, which is operative to transmit said composite digital data sequence over a reliable channel to said destination site.

17. A system according to claim 14, wherein said receiver is operative to decompose said composite digital data sequence into said encoded digital data component which is applied to said decoder, and an error detection information component, which is applied to said comparator.

18. A system according to claim 14, wherein said error detection information comprises a cyclic redundancy check code.

19. A system for transporting digital data across a reliable digital communication link comprising:

upstream of elements of procedure through which said digital data is processed that are farthest upstream elements of procedure relative to said reliable digital communication link, an encoder which is operative to produce encoded digital from unencoded digital data applied thereto, and an error detection operator which derives error detection information from said unencoded digital data; and a transmitter which is operative to process a composite digital data sequence in accordance with link access protocol elements of procedure and transmit a composite digital data sequence across said reliable digital communication link, said composite digital data sequence containing said encoded digital data and said error detection information.

20. A system according to claim 19, further comprising:
a receiver which is operative to receive said composite digital data sequence that has been transmitted across said reliable digital communication link by said transmitter, processes said composite digital data sequence in accordance with elements of procedure to provide encoded digital data components of said composite digital data sequence and which separates said composite digital data sequence into an encoded digital data component and an error detection information component;

a decoder which is operative to decode said encoded digital data component into decoded digital data;

an error detection operator which is operative to subject said decoded digital data to an error detection operation and thereby derive error detection information associated with said decoded digital data;

a comparator which compares said derived error detection information associated with said decoded digital data with the error detection information component separated from said composite digital data sequence; and a synchronization controller which is operative to controllably reset said digital data encoder and said digital data decoder in accordance with the output of said comparator.

21. A system according to claim 20, wherein said synchronization controller is operative to controllably request retransmission of digital data by said transmitter in accordance with the output of said comparator.

22. A method according to claim 19, wherein said error detection information comprises a cyclic redundancy check code.

23. For use with a reliable digital communication link, wherein, at a transmitter site, prior to being processed with elements of procedure that are farthest upstream elements of procedure relative to said reliable digital communication link, digital data to be transported over said reliable digital communication link from a source site to a destination site is subjected to each of an error detection operation, which derives error detection information associated with said digital data, and an encoding operation, which provides encoded digital data that is combined with said error detection information into a composite digital data sequence, said composite digital data sequence being processed in accordance with link access protocol elements of procedure and transmitted over said reliable digital communication link to a said destination site, an arrangement at said destination site for controlling the operation of said reliable digital communication link, said arrangement comprising:

a receiver which receives said composite digital data sequence that has been transmitted over said reliable digital communication link to said destination site and which processes said composite digital data sequence in accordance with elements of procedure to provide encoded digital data components of said composite digital data sequence;

a decoder which is operative to decode said encoded digital data received by said receiver and processed thereby into decoded digital data;

an error detection operator which is operative to subject said decoded digital data to an error detection operation and thereby derive error detection information associated with said decoded digital data;

a comparator which compares said derived error detection information associated with said decoded digital data with the error detection information component separated from said composite digital data sequence; and a synchronization controller which is operative to controllably reset the digital data encoder at said transmit site and said digital data decoder at said destination site in accordance with the output of said comparator.

24. An arrangement according to claim 23, wherein said error detection information comprises a cyclic redundancy check code.

* * * * *